US008033328B2

(12) United States Patent
Hall et al.

(10) Patent No.: US 8,033,328 B2
(45) Date of Patent: *Oct. 11, 2011

(54) DOWNHOLE ELECTRIC POWER GENERATOR

(75) Inventors: David R. Hall, Provo, UT (US); Scott Dahlgren, Alpine, UT (US); Michael Comfoltey, Springville, UT (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/467,095

(22) Filed: Aug. 24, 2006

(65) Prior Publication Data

US 2008/0047753 A1    Feb. 28, 2008

Related U.S. Application Data

(63) Continuation-in-part of application No. 10/982,612, filed on Nov. 5, 2004, now Pat. No. 7,190,084.

(51) Int. Cl.
*E21B 43/00* (2006.01)
(52) U.S. Cl. .............. 166/65.1; 166/66.5; 290/1 R
(58) Field of Classification Search .......... 166/66.5, 166/65.1; 175/104, 107
See application file for complete search history.

(56) References Cited

U.S. PATENT DOCUMENTS

| | | | |
|---|---|---|---|
| 2,414,719 A | | 1/1947 | Cloud |
| 2,940,039 A | * | 6/1960 | Yost et al. .............. 324/174 |
| 3,036,645 A | * | 5/1962 | Rowley .................. 175/93 |
| 3,967,201 A | | 6/1976 | Rorden |
| RE30,055 E | | 7/1979 | Claycomb |
| 4,416,494 A | | 11/1983 | Watkins |
| 4,676,310 A | | 6/1987 | Scherbatskoy |
| 4,721,172 A | | 1/1988 | Brett |
| 4,785,247 A | | 11/1988 | Meador |
| 4,788,544 A | | 11/1988 | Howard |
| 4,806,928 A | | 2/1989 | Vereruso |
| 4,965,998 A | * | 10/1990 | Estigoy et al. ............ 60/325 |
| 5,248,896 A | * | 9/1993 | Forrest .................... 290/1 R |
| 5,539,258 A | * | 7/1996 | Sutton et al. ............. 290/40 R |
| 5,839,508 A | * | 11/1998 | Tubel et al. .............. 166/65.1 |
| 6,123,561 A | | 9/2000 | Turner et al. |
| 6,392,317 B1 | | 5/2002 | Hall |
| 6,495,929 B2 | | 12/2002 | Bosley |
| 6,550,534 B2 | * | 4/2003 | Brett ...................... 166/65.1 |
| 6,670,880 B1 | | 12/2003 | Hall |
| 6,672,409 B1 | * | 1/2004 | Dock et al. ............... 175/107 |
| 6,688,396 B2 | | 2/2004 | Floerke et al. |
| 6,717,501 B2 | | 4/2004 | Hall |
| 6,745,844 B2 | * | 6/2004 | Henderson .............. 166/386 |
| 6,794,777 B1 | * | 9/2004 | Fradella .................. 310/74 |
| 6,799,632 B2 | | 10/2004 | Hall |

(Continued)

*Primary Examiner* — Kenneth L Thompson
*Assistant Examiner* — Cathleen Hutchins
(74) *Attorney, Agent, or Firm* — Brinks Hofer Gilson & Lione

(57) ABSTRACT

A downhole electric power generator is disclosed in one embodiment of the invention as including an inlet channel formed in a bore of a downhole tool string component for conveying a moving downhole fluid and a turbine coupled to the inlet channel to receive the downhole fluid. The turbine converts the energy of the moving downhole fluid into rotational energy where it is stored using a flywheel. The flywheel may then be coupled to an electrical generator to convert the rotational energy to electrical energy. In certain embodiments, a continuously variable transmission may be inserted between the turbine and the flywheel. The entire generator may, in certain embodiments, be designed small enough to reside in the wall of a downhole tool.

16 Claims, 13 Drawing Sheets

U.S. PATENT DOCUMENTS

| | | |
|---|---|---|
| 6,821,147 B1 | 11/2004 | Hall |
| 6,830,467 B2 | 12/2004 | Hall |
| 6,844,498 B2 | 1/2005 | Hall |
| 6,888,473 B1 | 5/2005 | Hall |
| 6,913,093 B2 | 7/2005 | Hall |
| 6,929,493 B2 | 8/2005 | Hall |
| 6,945,802 B2 | 9/2005 | Hall |
| 6,968,611 B2 | 11/2005 | Hall |
| 7,165,608 B2 * | 1/2007 | Schultz et al. ............... 166/66.5 |
| 7,201,239 B1 * | 4/2007 | Perry ............................ 175/104 |
| 7,246,660 B2 * | 7/2007 | Fripp et al. ................... 166/65.1 |
| 2002/0135179 A1 | 9/2002 | Boyle et al. |
| 2002/0162654 A1 * | 11/2002 | Bauer et al. .................. 166/65.1 |
| 2003/0042812 A1 * | 3/2003 | Post ............................. 310/90.5 |
| 2003/0192449 A1 * | 10/2003 | Fiske et al. ................... 104/281 |
| 2004/0104797 A1 | 6/2004 | Hall |
| 2004/0113808 A1 | 6/2004 | Hall |
| 2004/0145492 A1 | 7/2004 | Hall |
| 2004/0150532 A1 | 8/2004 | Hall |
| 2004/0164833 A1 | 8/2004 | Hall |
| 2004/0164838 A1 | 8/2004 | Hall |
| 2004/0182366 A1 * | 9/2004 | Andersson et al. ...... 123/406.47 |
| 2004/0216847 A1 | 11/2004 | Hall |
| 2004/0244916 A1 | 12/2004 | Hall |
| 2004/0244964 A1 | 12/2004 | Hall |
| 2004/0246142 A1 | 12/2004 | Hall |
| 2005/0001735 A1 | 1/2005 | Hall |
| 2005/0001736 A1 | 1/2005 | Hall |
| 2005/0001738 A1 | 1/2005 | Hall |
| 2005/0035874 A1 | 2/2005 | Hall |
| 2005/0035875 A1 | 2/2005 | Hall |
| 2005/0035876 A1 | 2/2005 | Hall |
| 2005/0036507 A1 | 2/2005 | Hall |
| 2005/0039912 A1 | 2/2005 | Hall |
| 2005/0045339 A1 | 3/2005 | Hall |
| 2005/0046586 A1 | 3/2005 | Hall |
| 2005/0046590 A1 | 3/2005 | Hall |
| 2005/0067159 A1 | 3/2005 | Hall |
| 2005/0070144 A1 | 3/2005 | Hall |
| 2005/0082092 A1 | 4/2005 | Hall |
| 2005/0092499 A1 | 5/2005 | Hall |
| 2005/0093296 A1 | 5/2005 | Hall |
| 2005/0115717 A1 | 6/2005 | Hall |
| 2005/0139393 A1 * | 6/2005 | Maurer et al. .................. 175/57 |
| 2005/0145406 A1 | 7/2005 | Hall |
| 2005/0150653 A1 | 7/2005 | Hall |
| 2005/0155450 A1 * | 7/2005 | Jennings .................... 74/572.12 |
| 2005/0161215 A1 | 7/2005 | Hall |
| 2005/0173128 A1 | 8/2005 | Hall |
| 2005/0212530 A1 | 9/2005 | Hall |
| 2005/0236160 A1 | 10/2005 | Hall |
| 2005/0284662 A1 | 12/2005 | Hall |
| 2006/0016606 A1 * | 1/2006 | Tubel et al. ................... 166/386 |
| 2006/0117759 A1 * | 6/2006 | Hall et al. ........................ 62/3.2 |
| 2006/0260797 A1 | 11/2006 | Hall |
| 2006/0260798 A1 * | 11/2006 | Hall et al. .................... 166/65.1 |
| 2006/0260801 A1 * | 11/2006 | Hall et al. ................... 166/117.5 |
| 2007/0017671 A1 | 1/2007 | Clark et al. |
| 2007/0194948 A1 * | 8/2007 | Hall et al. .................. 340/854.8 |

\* cited by examiner

DOWNHOLE ELECTRIC POWER GENERATOR

CROSS REFERENCE TO RELATED APPLICATIONS

This application is a continuation-in part of U.S. patent application Ser. No. 10/982,612 which was filed on Nov. 5, 2004 now U.S. Pat. No. 7,190,084 and is herein incorporated by reference for all that it discloses.

BACKGROUND OF THE INVENTION

1. Field of the Invention

The present invention relates to electric power generators and more particularly to electric power generators for use in a downhole drilling environment.

2. Background

The ability to access and transmit data along a drill string has been a goal of the oil and gas industry for more than half a century. As exploration and drilling technology has improved, this goal has become more important to the industry. For example, to take advantage of various advances in downhole tools and techniques, it would be highly beneficial to transmit real-time data such as temperature, pressure, inclination, salinity, and the like to the surface where it can be analyzed and used beneficially. Nevertheless, because of the complexity, expense, and unreliability of many proposed or attempted downhole transmission systems, these systems have failed to achieve significant commercial use or acceptance.

In U.S. Pat. No. 6,670,880 as well as numerous other related patents and pending patent applications, the present inventors have disclosed a "downhole transmission system" that overcomes many of the problems and limitations of prior art systems. In this downhole transmission system, data is transmitted in real time along a drill string using network hardware integrated directly into the drill string. This network hardware enables high-speed communication between surface equipment, such as analysis, diagnostic, and control equipment, and downhole equipment, such as tools and sensors located along the drill string.

With the installation of network and other related hardware comes the need for an efficient and reliable power source to operate this hardware. Such a power source must be able to provide reliable power in the extreme conditions of a downhole environment. Although batteries provide one option, the use of batteries is hindered by their inherently finite life and the need for frequent replacement and/or recharging. This may be problematic in downhole drilling application where access to these batteries may require tripping and disassembly of the drill string. Battery function may also be impaired by the extreme temperatures, pressures, or other conditions downhole.

In addition, various electrical generators have also been disclosed for generating electrical power in a downhole environment. These generators, however, create additional problems that limit their usefulness downhole. Specifically, some of these generators obstruct the central borehole of the drill string. This undesirably inhibits the flow of drilling fluid and obstructs the passage of wireline tools or other equipment through the central bore. Moreover, many downhole generators are designed for implementation in production wells rather than in downhole drilling strings. Some of these generators may also be complex and have substantial mass, making them costly to implement and maintain and/or difficult to replace or repair. In other cases, these generators may be ill-equipped for operation in the extreme temperatures, pressures, and corrosive conditions downhole.

Accordingly, what is needed is an improved and robust electrical generator for use in a downhole environment. Ideally, such a generator would generate electricity without obstructing the central borehole of a drill string. Further needed is a generator that is more compact and efficient than previously disclosed downhole generators.

SUMMARY OF THE INVENTION

Consistent with the foregoing, and in accordance with the invention as embodied and broadly described herein, a downhole electric power generator is disclosed in one embodiment of the invention as including an inlet channel to convey a moving downhole fluid and a turbine coupled to the inlet channel to receive the downhole fluid. The turbine converts the energy of the moving downhole fluid into rotational energy where it is stored with a flywheel. The flywheel is coupled to an electrical generator to convert the rotational energy to electrical energy. In certain embodiments, a continuously variable transmission is inserted between the turbine and the flywheel. The entire generator may, in certain embodiments, be designed small enough to reside in the wall of a downhole tool.

In selected embodiments, the flywheel includes magnetic bearings to support the load of the flywheel during rotation thereby conserving energy and reducing friction. These magnetic bearing may be provided, for example, using a Halbach array of magnets. The flywheel may, in certain embodiments, be enclosed within a vacuum chamber to reduce windage losses of the flywheel and other components.

In certain embodiments, the downhole generator may also include an outlet channel to carry away the downhole fluid routed through the turbine. This outlet channel may, in certain embodiments, be routed into the central bore of a downhole tool to return the downhole fluid to the central bore. Alternatively, the outlet channel may be routed into the annulus between the downhole tool and a borehole wall.

In another aspect of the invention, a method for generating electricity in a downhole environment may include receiving a moving downhole fluid and converting the energy of the downhole fluid to rotational energy. This rotational energy may then be stored. The stored energy may then be converted to electrical energy.

In certain embodiments, storing includes storing the rotational energy with a rotating flywheel. The method may also include magnetically levitating the rotating flywheel. The magnetic levitation, for example, may include levitating the flywheel using a Halbach array of magnets.

In another aspect of the invention, an apparatus for generating electricity in a downhole environment includes a downhole tool and a downhole generator installed in the downhole tool to provide a source of electrical power. The downhole generator includes a turbine to receive a moving downhole fluid and to convert the energy thereof into rotational energy. A flywheel is coupled to the turbine to store the rotational energy. An electrical generator is coupled to the flywheel to convert the rotational energy to electrical energy.

These and other features and advantages of the present invention will be set forth or will become more fully apparent in the description that follows and in the appended claims. The features and advantages may be realized and obtained by means of the elements and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of apparatus and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
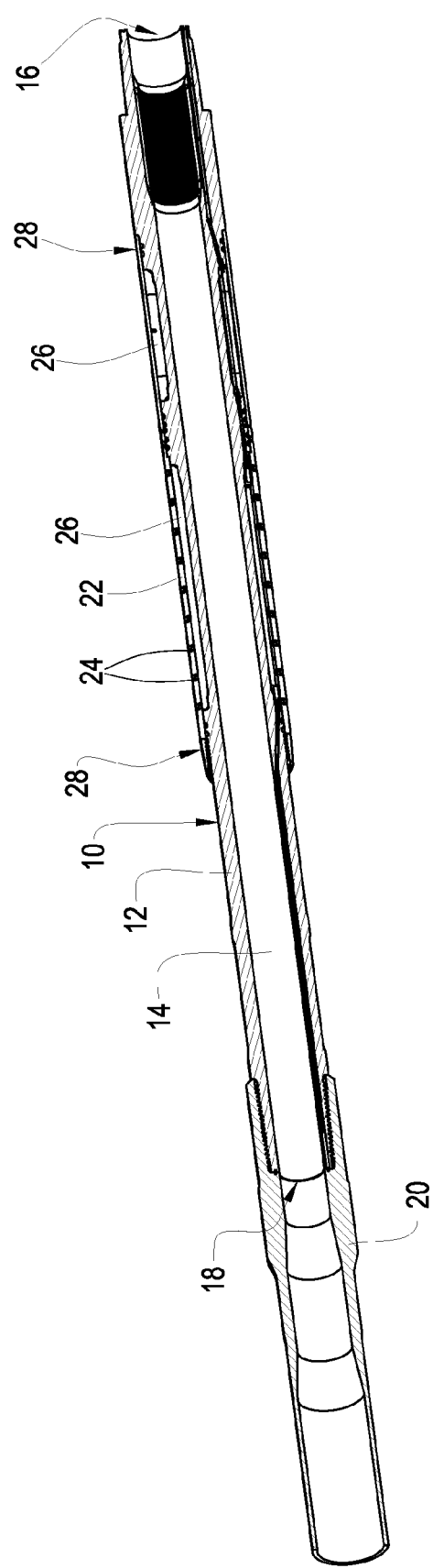
FIG. 1 is a perspective cross-sectional view of one embodiment of a downhole tool used to accommodate a downhole generator in accordance with the invention.

Referring to FIG. 1, one embodiment of a downhole tool 10 or downhole tool string component 10 for accommodating a downhole generator in accordance with the invention is illustrated. One of ordinary skill in the art will recognize that a downhole tool 10 suitable for accommodating a generator in accordance with the invention may take on many shapes and configurations and thus is not limited to the illustrated embodiment. As shown, in one embodiment, such a downhole tool 10 may include a tubular body 12 forming a central bore 14. First and second ends 16, 18 of the tubular body 12 may be adapted to connect to adjacent downhole components 20. In selected embodiments, a compliant cover 22, such as a sleeve 22, may be installed around the outer surface of the tubular body 12. The compliant cover 22 may, in certain embodiments, be provided with one or more stress relief grooves 24 on an inner or outer surface of the cover 22 to help it to flex, bend, and stretch with the downhole tool 10 during drilling operations. This may help the cover 22 conform to the downhole tool 10 in directional drilling applications where a drill string may bend in different directions.

The cover 22 and downhole tool 10 together may form one or more enclosures 26. These enclosures 26 may be used to house electronics such as sensors, tools, network hardware, computer hardware, or the like. The enclosures 26 may also provide an ideal location for a downhole generator in accordance with the invention, as will be described in more detail hereafter. Because the enclosures 26 are located around the outside diameter of the downhole tool 10 but inside the cover 22, the enclosures' contents may be protected from fluid or other substances present inside the central bore 14 as well as those flowing through the annulus. To prevent unwanted fluids or other substances from entering the enclosures 26, one or more O-rings or other suitable seals may be installed between the cover 22 and the downhole tool 10, such as near the ends 28 of the cover 22. For more information regarding the design and function of the compliant cover 22, the reader is referred to patent application Ser. No. 11/164,572, and entitled Compliant Covering of a Downhole Component, having common inventors with the present invention, which is herein incorporated by reference in its entirety.

Figure 2:
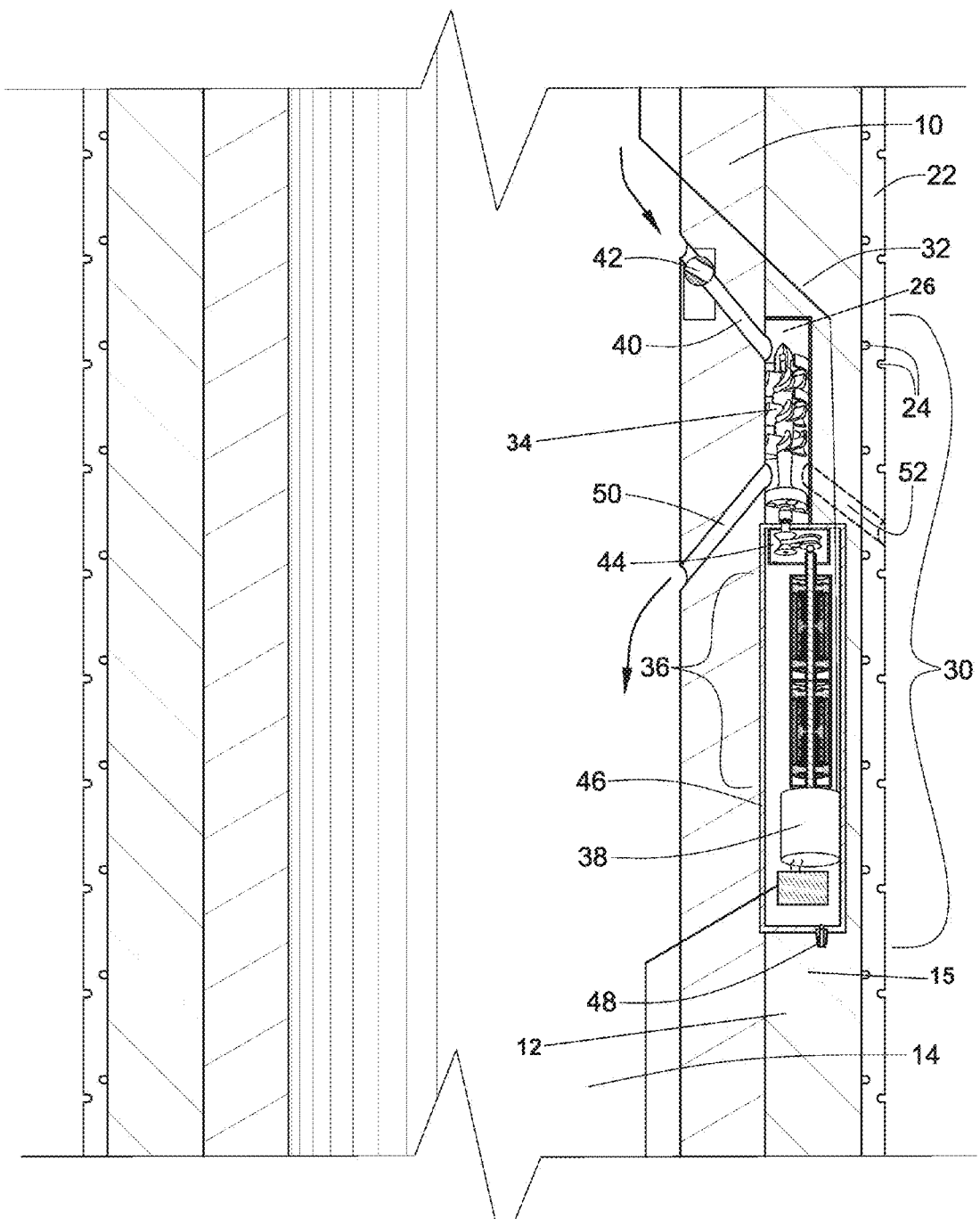
FIG. 2 is a cross-sectional view of one embodiment of a downhole generator for installation in a downhole tool.

Referring to FIG. 2, in one embodiment, a downhole electric power generator 30 in accordance with the invention may be mounted in a wall 15 of a downhole tool 10, such as in the enclosure 26 described in association with FIG. 1. In selected embodiments, the generator 30 may be housed within a structure 32 inserted into the enclosure 26.

In general, a downhole generator 30 in accordance with the invention may include a turbine 34, one or more flywheels 36, and an electrical generator 38. The turbine 34 may receive, through an inlet channel 40, a moving downhole fluid, such as drilling mud. This downhole fluid may be used to turn blades on the turbine 34 to produce rotational energy (e.g., by rotating a shaft, etc.). This rotational energy may be used to accelerate one or more flywheels 36 to store the energy. In one embodiment, the energy stored by the flywheels 36 may be used to drive an electrical generator 38. As previously mentioned, the electrical power produced by the generator 38 may be used to power electrical devices such as network or computer hardware located downhole.

One advantage of using flywheels 36 to store energy downhole is that flywheels 36 are not as affected by high downhole temperatures as are chemical batteries. Flywheels 36 are also not hindered by the memory effect of chemical batteries. Consequently, flywheels 36 have a longer service life than chemical batteries and may be charged and recharged repeatedly without degradation. Other positive attributes of flywheels 36 are their large power densities and power outputs. This may be especially advantageous when integrating a generator 30 into a downhole drill string, where space is typically very limited. The ability to make a flywheel 36 very compact, for example, allows the flywheel 36 to be installed within the narrow confines of the wall of a downhole tool.

In selected embodiments, the turbine 34 may be used to periodically accelerate the flywheels 36. After the flywheels 36 have acquired a desired speed, the turbine 34 may be shut down. This may be accomplished by simply interrupting the flow of fluid through the inlet channel 40. The flywheels 36 may then continue to drive the electrical generator 38. This may save the turbine 34 from the abrasive effects of drilling fluids passing therethrough by utilizing it only when needed. In certain embodiments, a valve 42 may be used to interrupt the flow of drilling fluid through the inlet channel 40 to selectively start and stop the turbine 34. It is contemplated that the valve 42 could be characterized by discrete operation (i.e., either "open" or "closed"), or the valve 42 could be gradually opened or closed to vary the amount and speed of fluid used to rotate the turbine 34. The latter example may be used to gradually bring the turbine 34 and flywheels 36 up to speed, or gradually to a stop, to reduce torque or stress on the components.

In certain embodiments, a feedback loop may be used to open the valve 42 when the speed of the flywheels 36 falls below a certain threshold. In other embodiments, the valve 42 may be opened based on the demand for electricity. In selected embodiments, the valve 42 may either be controlled uphole at the surface or downhole by devices such as electronic hardware.

In certain embodiments, a transmission 44, such as a continuously variable transmission 44, may be installed between the turbine 34 and the flywheels 36. A continuously variable transmission 44, for example, may be used to gradually bring the flywheels 36 up to speed by adjusting the "gear ratio" between the turbine 34 and the flywheels 36. This may reduce the chance that the turbine 34 or flywheels 36 are damaged by rapid or sudden movement of one of the components 34, 36 and may reduce the torque or stress between the two.

In certain embodiments, one or more of the flywheels 36, electrical generator 38, continuously variable transmission 44, or other components may be housed within a vacuum chamber 46. The vacuum chamber 46 may improve the efficiency of the system by reducing the windage losses (e.g., losses due to air resistance) of the flywheels 36, electrical generator 38, continuously variable transmission 44, or the like. To create a mechanical coupling between the turbine 34 and the continuously variable transmission 44 without compromising the seal of the vacuum chamber 46, a magnetic coupling may be used between the turbine 34 and the continuously variable transmission 44. Wires for carrying electrical current, on the other hand, may be routed from the generator 38 through the vacuum chamber 46 using a static seal. In selected embodiments, a fitting 48 may be provided to remove air, gases, or other matter from the chamber 46. These concepts will be illustrated and explained in more detail hereafter in association with FIG. 4.

Once the turbine 34 has extracted the energy from the downhole fluids passing therethrough, the downhole fluids may be vented or expelled through an outlet channel 50. In selected embodiments, the outlet channel 50 may simply return the downhole fluid to the central bore 14 where it originated. In other embodiments, an outlet channel 52 (indicated by the dotted lines) may be vented to the annulus between the downhole tool 10 (including the cover 22) and the borehole wall. The greater pressure differential that exists between the central bore 14 and the annulus may be used to increase the speed of the fluid and thus provide additional energy transfer to the turbine 34. However, due to the risks of leaks or "wash outs," there may be reluctance on the part of some drilling operators to provide a channel between the central bore 14 and the annulus. In such cases, the downhole fluid may be routed back into the central bore 14.

Figure 3:
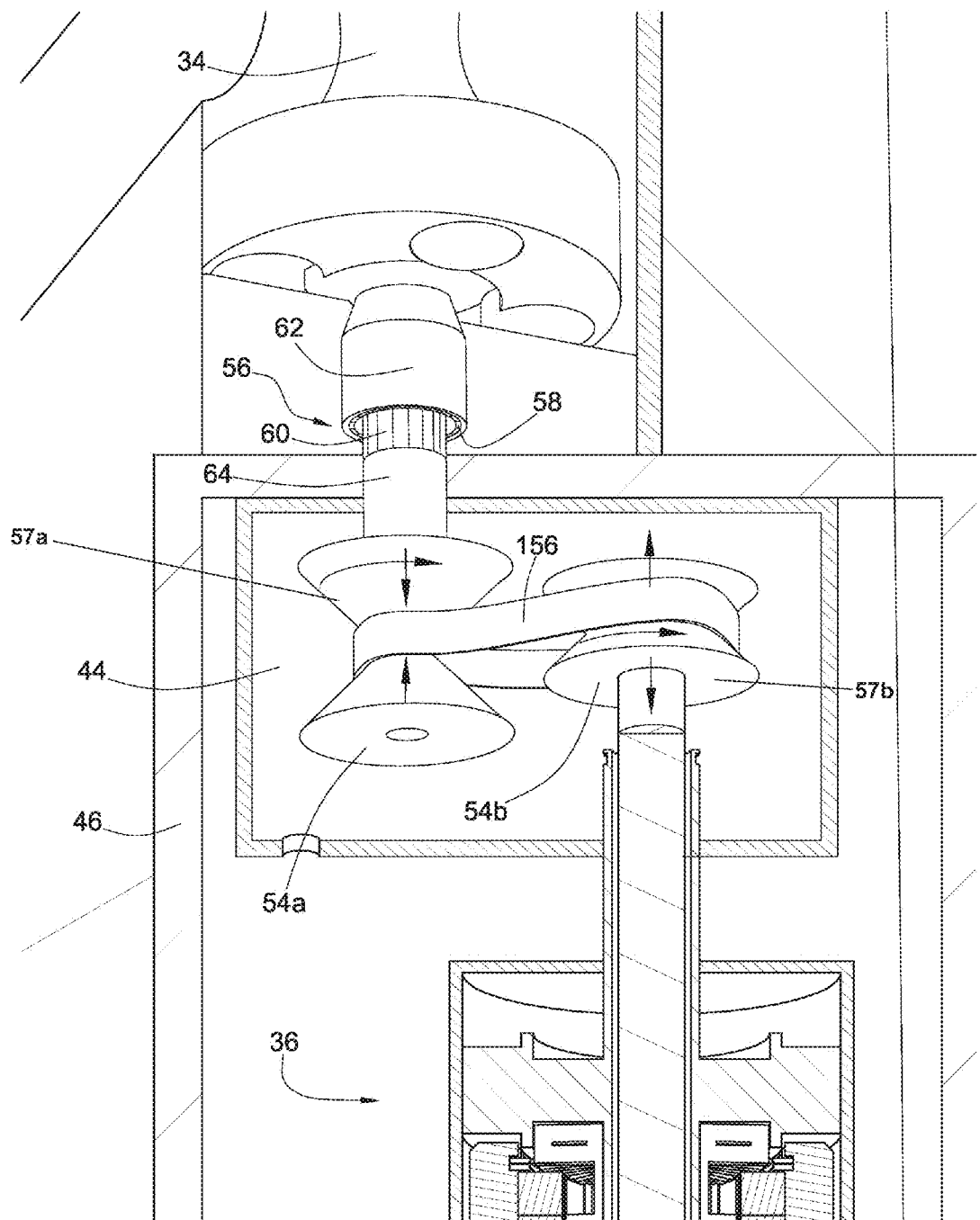
FIG. 3 is an enlarged cross-sectional view of various components of the downhole generator illustrated in FIG. 2.

Referring to FIG. 3, one embodiment of a continuously variable transmission 44 may include a variable-diameter pulley (VDP) transmission 44. This type of transmission 44 may include pulleys 54a, 54b connected by a belt 56 or chain 56. The pulleys 54a, 54b may include pairs of opposing cones 57a and 57b that move relative to one another to continuously change the "gear ratio" between the pulleys 54a, 54b. This enables the flywheels 36 to smoothly and efficiently accelerate to a desired speed while allowing the turbine 34 to rotate at a more uniform and constant speed. This also allows the turbine 34 to rotate at a speed corresponding to its peak efficiency.

In selected embodiments, a magnetic coupling 56 may be used between the turbine 34 and the continuously variable transmission 44. This magnetic coupling 56 may include, for example, various magnets 58 along an inner circumference of a shaft 62 coupled to the turbine 34. These magnets 58 may interact with magnets 60 placed around the outer circumference of a shaft 64 coupled to the transmission 44. Power may be transmitted between the shafts 62, 64 by the magnetic forces acting between the magnets 58, 60. Such a magnetic coupling may be used to prevent vacuum leaks that would occur with a physical coupling, where a rotating shaft typically contacts a static housing.

Figure 4:
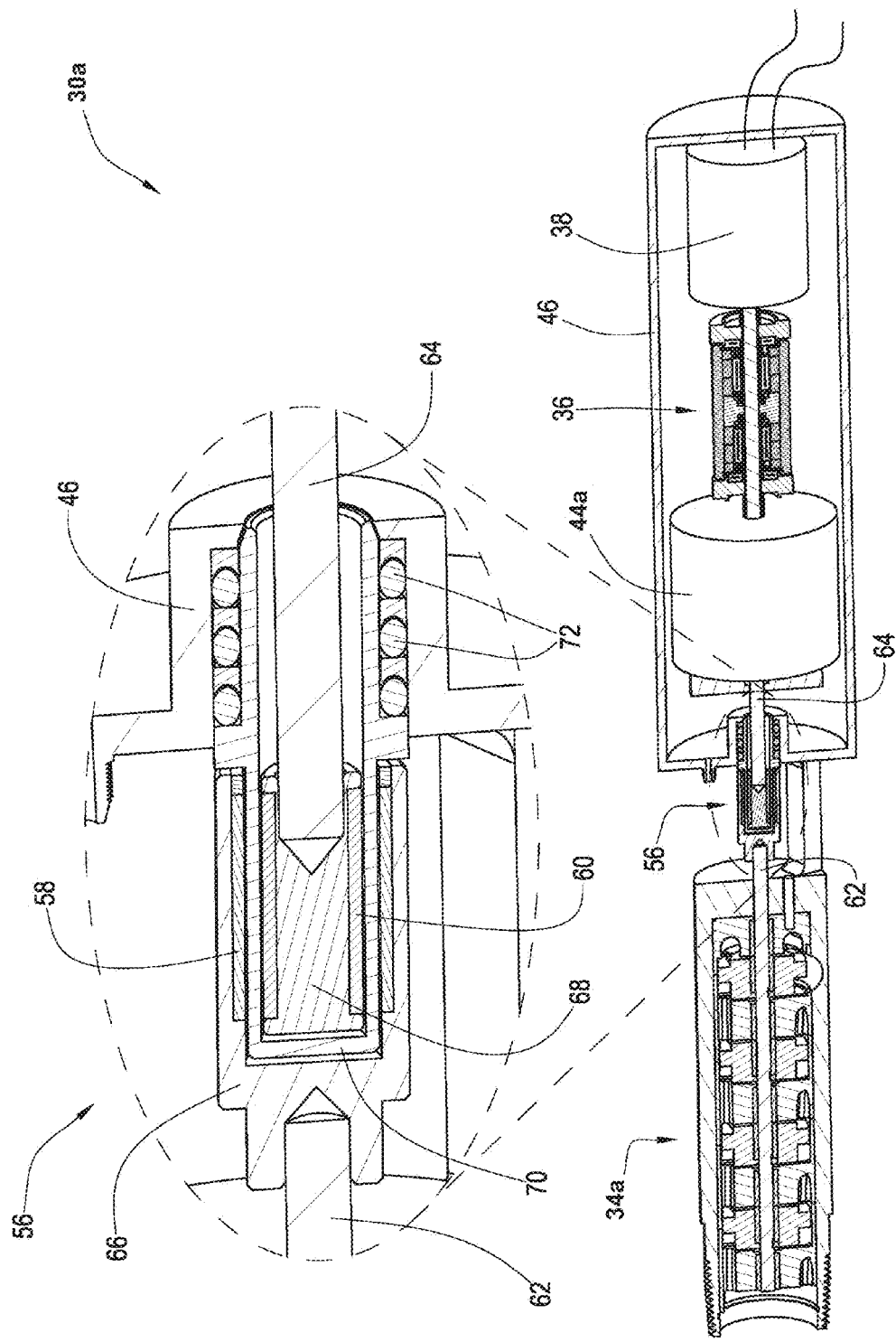
FIG. 4 is a perspective cross-sectional view of another embodiment of a downhole generator in accordance with the invention.

Referring to FIG. 4, one alternative embodiment of a downhole generator 30a in accordance with the invention is illustrated. As shown, the downhole generator 30a may include a turbine 34a (shown here having an alternative design), a continuously variable transmission 44a, a flywheel 36, and an electrical generator 38. The continuously variable transmission 44a, flywheel 36, and electrical generator 38 are enclosed within a vacuum chamber 46. The continuously variable transmission (CVT) 44a is shown in an alternative configuration and may include, for example, a variable-diameter pulley CVT (as previously discussed), a roller-based CVT, a hydrostatic CVT, or the like.

As is also shown, the downhole generator 30a may include a magnetic coupling 56 to transmit power between the turbine shaft 62 and the continuously variable transmission shaft 64. In one embodiment, an outer rotor 66 containing one or more magnets 58 may be connected to the turbine shaft 62. Similarly, an inner rotor 68 containing one or more magnets 60 may be connected to the shaft 64 of the continuously variable transmission 44a. The inner rotor 68 and outer rotor 66 may be separated by a closed cylinder 70, which may be statically sealed to the vacuum chamber 46. For example, one or more O-rings 72 or other seals 72 may be used to create a static seal between the cylinder 70 and the vacuum chamber 46, thereby completely sealing the vacuum chamber 46 from the outside environment. Alternatively, the cylinder 70 and the vacuum chamber 46 may be formed from or connected into a single structure. The outer rotor 66 may be used to exert torque on the inner rotor 68 by way of the magnetic fields, which pass through the cylinder 70, generated by the permanent magnets 58, 60.

Figure 5:
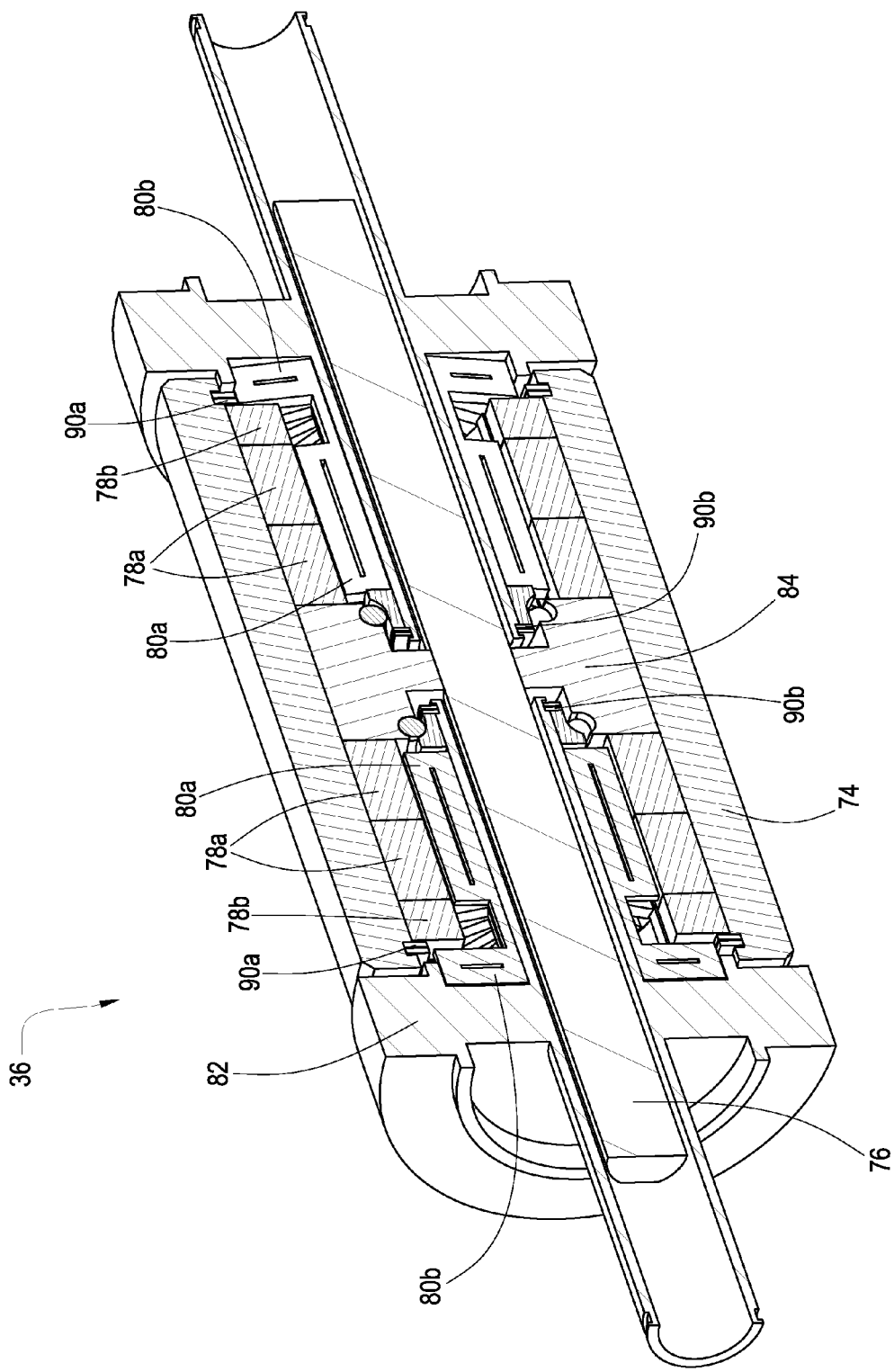
FIG. 5 is a perspective cross-sectional view of one embodiment of a flywheel for use in conjunction with a downhole generator.

Referring to FIG. 5, in one embodiment, a flywheel 36 in accordance with the invention may include a rotor 74, in this example shaped like a cylinder, rotating with a shaft 76. A spoke 84 may be used to connect the rotor 74 to the shaft 76. Thus, rotation of the shaft 76 produces rotation of the rotor 74, and vice versa. The rotor 74 stores rotational energy generated by the turbine 34 in the form of kinetic energy. The amount of energy stored by the flywheel 36 is directly proportional to the product of the rotor's moment of inertia and the square of the rotor's angular velocity. Accordingly, a flywheel's storage capacity improves by concentrating the flywheel's mass away from its center of rotation and by increasing its angular velocity. The cylindrical design of the rotor 74 is efficient in that it concentrates most of the mass of the rotor 74 as far away from the shaft 76 as possible for given space constraints.

In contrast to the moving rotor 74, a stationary structure 82, or centralizer structure 82, may be used to hold stationary parts in place, as well as to maintain the stability of the shaft 76 and the rotor 74. In one embodiment, inductive laminates 80a, 80b may be connected to the centralizer structure 82. Similarly, arrays of permanent magnets 78a, 78b, in this example Halbach arrays of magnets 78a, 78b, may be connected to the rotor 74. The inductive laminates 80a, 80b, and arrays of permanent magnets 78a, 78b together provide "magnetic bearings" to support the load of the rotor 74 by causing it to magnetically levitate. To keep various components in place, the flywheel 36 may also include one or more retention mechanisms 90a, 90b, such as snap rings 90a, 90b. Some retention mechanisms 90a may rotate with the rotor 74 while other retention mechanisms 90b may remain stationary relative to the centralizer structure 82.

Figure 6:
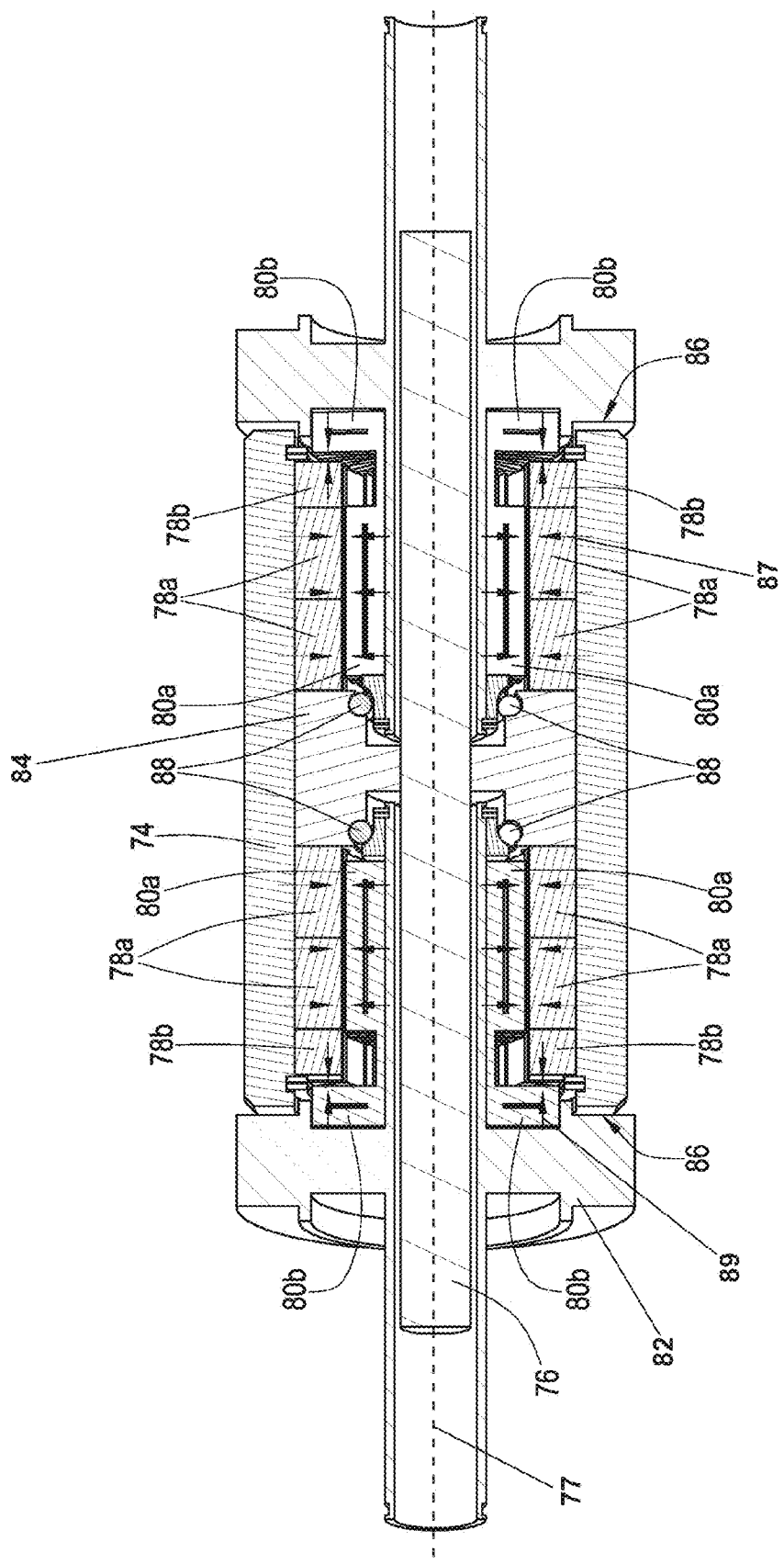
FIG. 6 is an alternative perspective cross-sectional view of the flywheel illustrated in FIG. 5.

Referring to FIG. 6, in operation, as the permanent magnets 78a, 78b rotate about the long axis 77 of the shaft 76, the magnets 78a, 78b generate an alternating electrical current in the inductive laminates 80a, 80b. This current generates a magnetic field that becomes stronger as the angular velocity of the rotor 74 increases. The magnetic field of the inductive laminates 80a, 80b interacts with the magnetic field of the permanent magnets 78a, 78b. These magnetic fields repel one another, causing the rotor 74 to levitate relative to the inductive laminates 80a, 80b and centralizer structure 82. In selected embodiments, certain inductive laminates 80a may exert forces 87 on magnets 78a perpendicular to the axis 77 of rotation of the shaft 76, causing the rotor 74 to levitate radially with respect to the axis 76. Likewise, other inductive laminates 80b may exert forces 89 on magnets 78b in a direction parallel to the axis 77, stabilizing the rotor 74 in an axial direction with respect to the axis 77 and preventing the rotor 74 from contacting the sides 86 of the centralizer structure 82.

Figure 7:
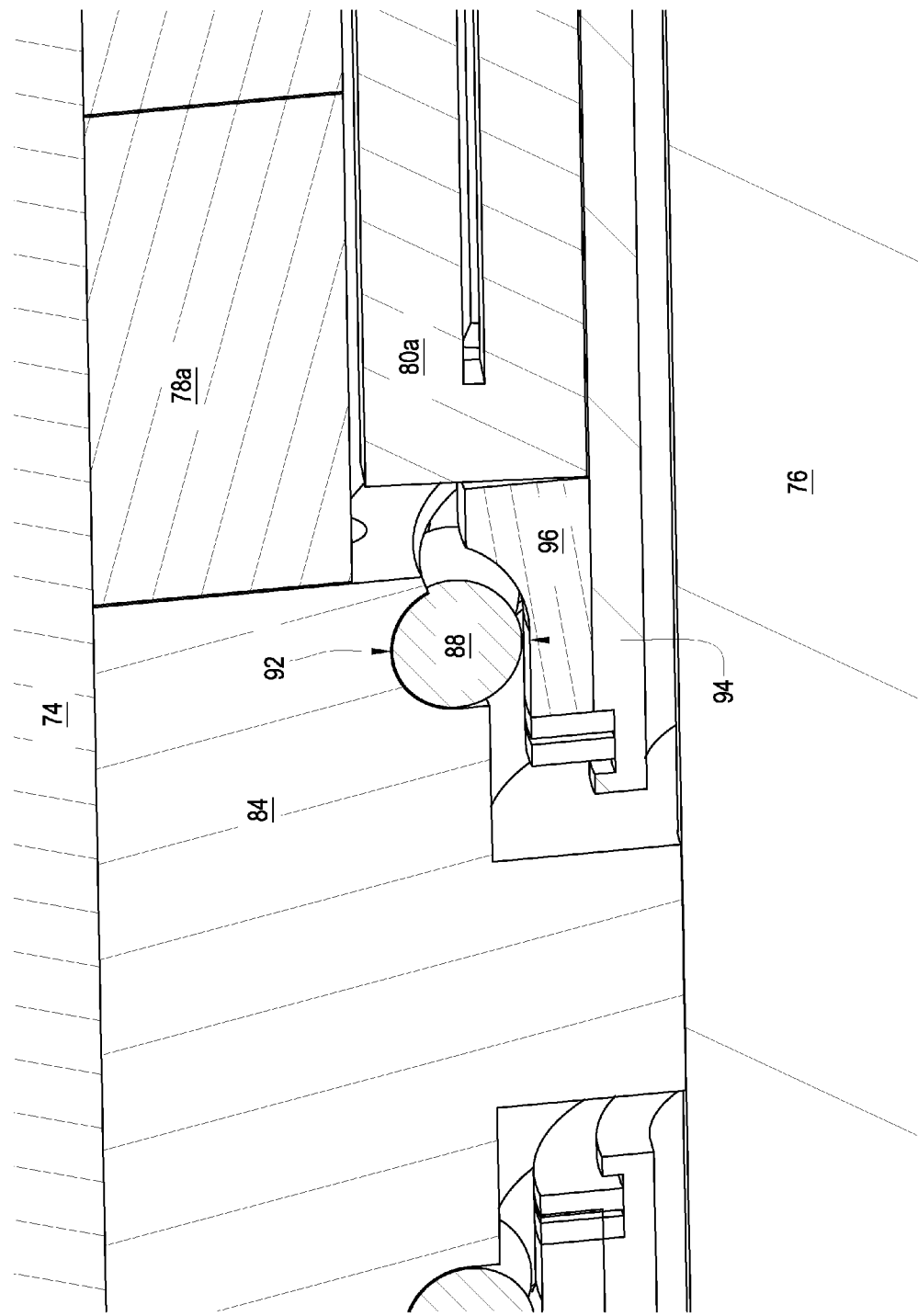
FIG. 7 is an enlarged cross-sectional view of various components of the flywheel illustrated in FIG. 5.

Referring to FIG. 7, while continuing to refer generally to FIG. 6, in certain embodiments, floating bearings 88 may be used to reduce the friction between the rotor 74 and the centralizer 82 (and other stationary elements) before the magnetic fields have acquired sufficient strength to levitate the rotor 74. In selected embodiments, these bearings 88 may ride against a moving bearing surface 92 coupled to the moving components, such as the spoke 84. Similarly, these bearings 88 may ride against a stationary bearing surface 94 coupled to the stationary components (i.e., the centralizer structure 82, etc.). In the depicted embodiment, the bearings 88 ride against a retainer 96. This retainer 96 may be used to retain the bearings 88 as well as provide a bearing surface 94.

When the rotor 74 reaches a critical speed, the magnetic field begins to levitate the rotor 74. Similarly, at some critical speed, the centrifugal force created by the rotation causes the bearings 88 to disengage from the bearing surface 94 and retract towards the surface 92. In addition to reducing friction, this also saves the bearings 88 from wear and tear that would otherwise occur when the rotor 74 is spinning at a very high velocity.

Figure 8:
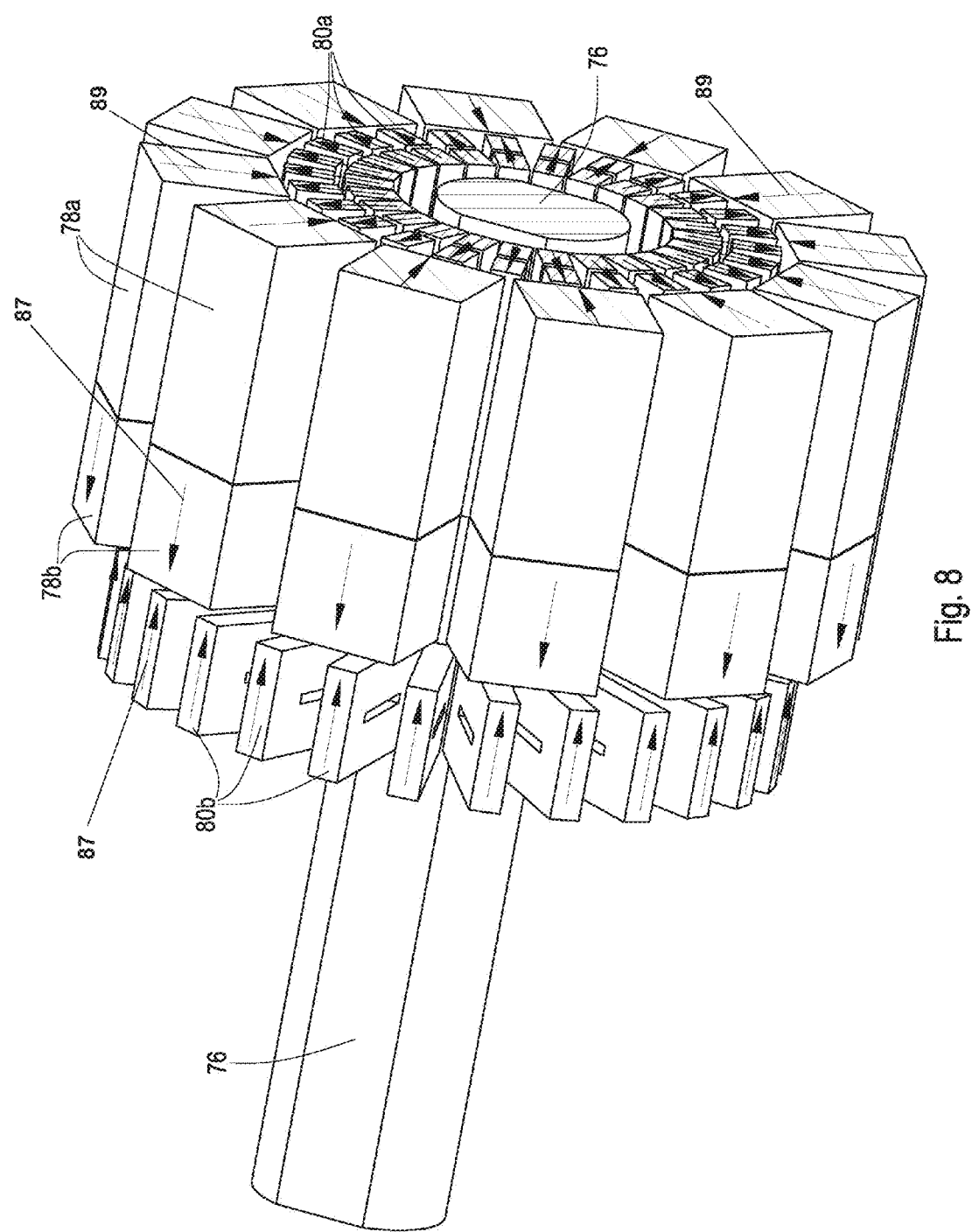
FIG. 8 is a perspective cross-sectional view showing the magnetic bearings of the flywheel illustrated in FIG. 5.

FIG. 8 is a perspective cross-sectional view of the arrays of permanent magnets 78a, 78b and the inductive laminates 80a, 80b. As shown, in one embodiment the magnets 78a, 78b may be arranged in a radial pattern within the rotor 74 (not illustrated). Similarly, the inductive laminates 80a responsible for generating magnetic forces 89 perpendicular to the axis 77 may be arranged in a radial pattern inside the permanent magnets 78a, 78b. These inductive laminates 80a may generate magnetic forces repelling the permanent magnets 78a. Likewise, the inductive laminates 80b responsible for generating magnetic forces 87 parallel to the axis 77 may be positioned in an axial direction relative to the magnets 78a, 78b. These inductive laminates 80b may generate magnetic forces repelling the permanent magnets 78b.

Figure 9:
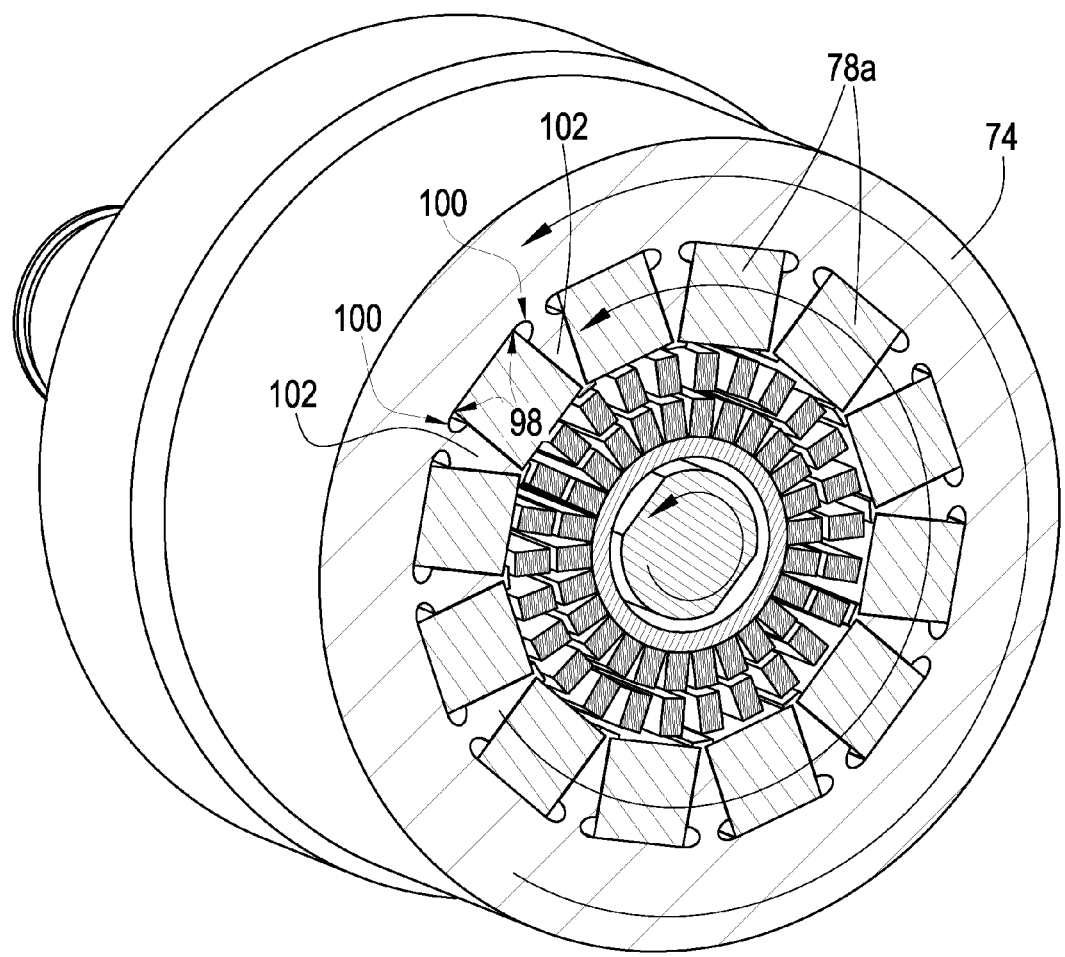
FIG. 9 is an alternative cross-sectional view of selected components of the flywheel illustrated in FIG. 5.

Referring to FIG. 9, one of the limiting factors when designing a flywheel rotor 74 is the tensile strength of the material used to construct the rotor 74. In general the stronger the material used for the rotor 74, the faster it may be rotated, and the more energy it can store. If the centrifugal force exerted on the rotor 74 exceeds its tensile strength, the rotor 74 will break apart, discharging all of its energy at once. Thus, a rotor 74 may typically be constructed of materials such as high-strength steel, composite materials, composites such as carbon fiber or kevlar embedded in matrix resins, or the like.

Furthermore, the shape and configuration of the rotor 74 may also affect the magnitude and concentration of stresses exerted on the rotor 74. For example, the material of the rotor 74 may tend to fail at or near locations, such as at or near the corners 98, where the permanent magnets 78a are inset into the rotor 74. Thus, in selected embodiments, the rotor 74 may be formed with radius cuts 100 at or near the corners 98 of the magnets 78a. This may diffuse stresses by distributing them over a larger area and may reduce the number of sharp angles where cracks or points of fatigue may develop. This may also provide greater flexibility to the projections 102, enabling them to flex rather than crack or break.

Figure 10:
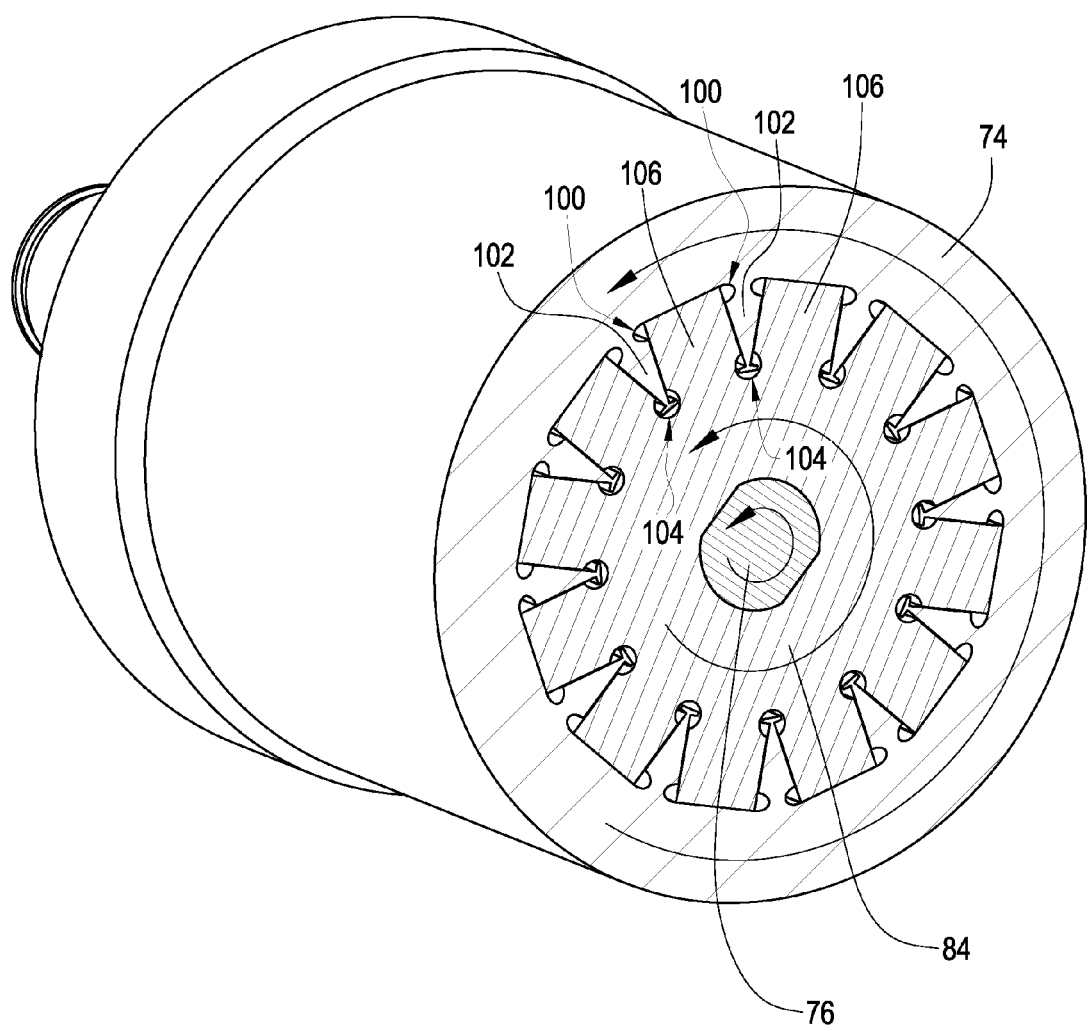
FIG. 10 is an alternative cross-sectional view of selected components of the flywheel illustrated in FIG. 5.

Referring to FIG. 10, similarly, in selected embodiments a spoke 84 may also interlock with and be inset into the rotor 74. A significant amount of force or torque may be exerted on the spoke 84 because it connects the shaft 76 to the rotor 74. Like the previous example, in certain embodiments, the rotor 74 may be provided with radius cuts 100 at or near the base of the projections 102 where the spoke 84 interfaces with the rotor 74. Similarly, the spoke 84 may include radius cuts 104 at or near the base of the projections 106 extending into the rotor 74. This may also provide greater flexibility to the spoke projections 106, reducing the chance that they will crack or break.

Figure 11:
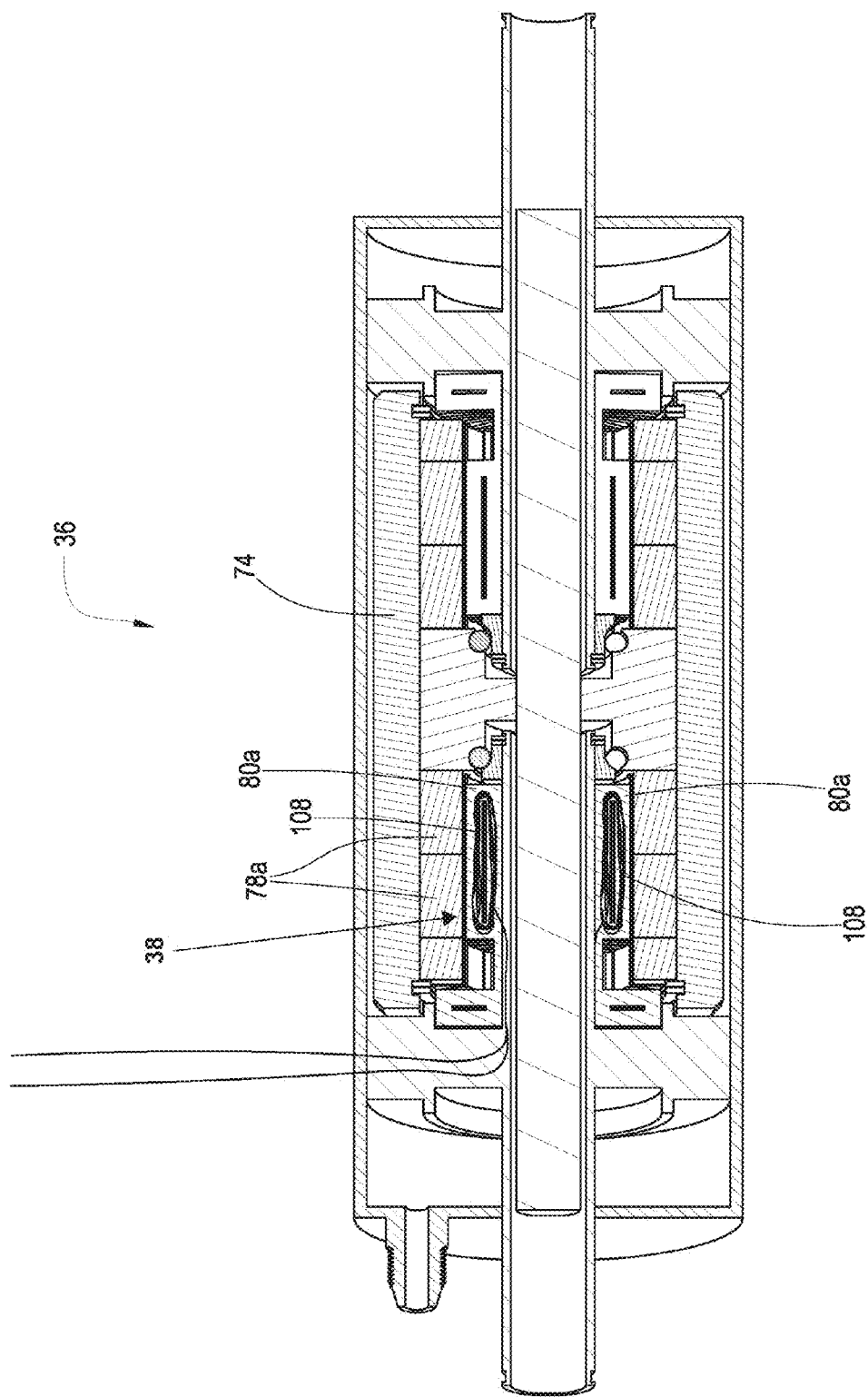
FIG. 11 is a perspective cross-sectional view of one embodiment of a flywheel which is also configured to generate electricity.

Referring to FIG. 11, in certain embodiments, it is contemplated that a flywheel 36 and electrical generator 38 could be integrated into a single unit. For example, the inductive laminates 80a could be designed to include coils 108 of wire. As the rotor 74 and permanent magnets 78a rotate, the changing magnetic fields that occur through the inductive laminates 80a could be used to induce an electrical current in the coils 108. This electrical current could then be used to power downhole devices, such as network hardware or other electronics. In selected embodiments, the electrical current may be converted from alternating current to direct current.

Figure 12:
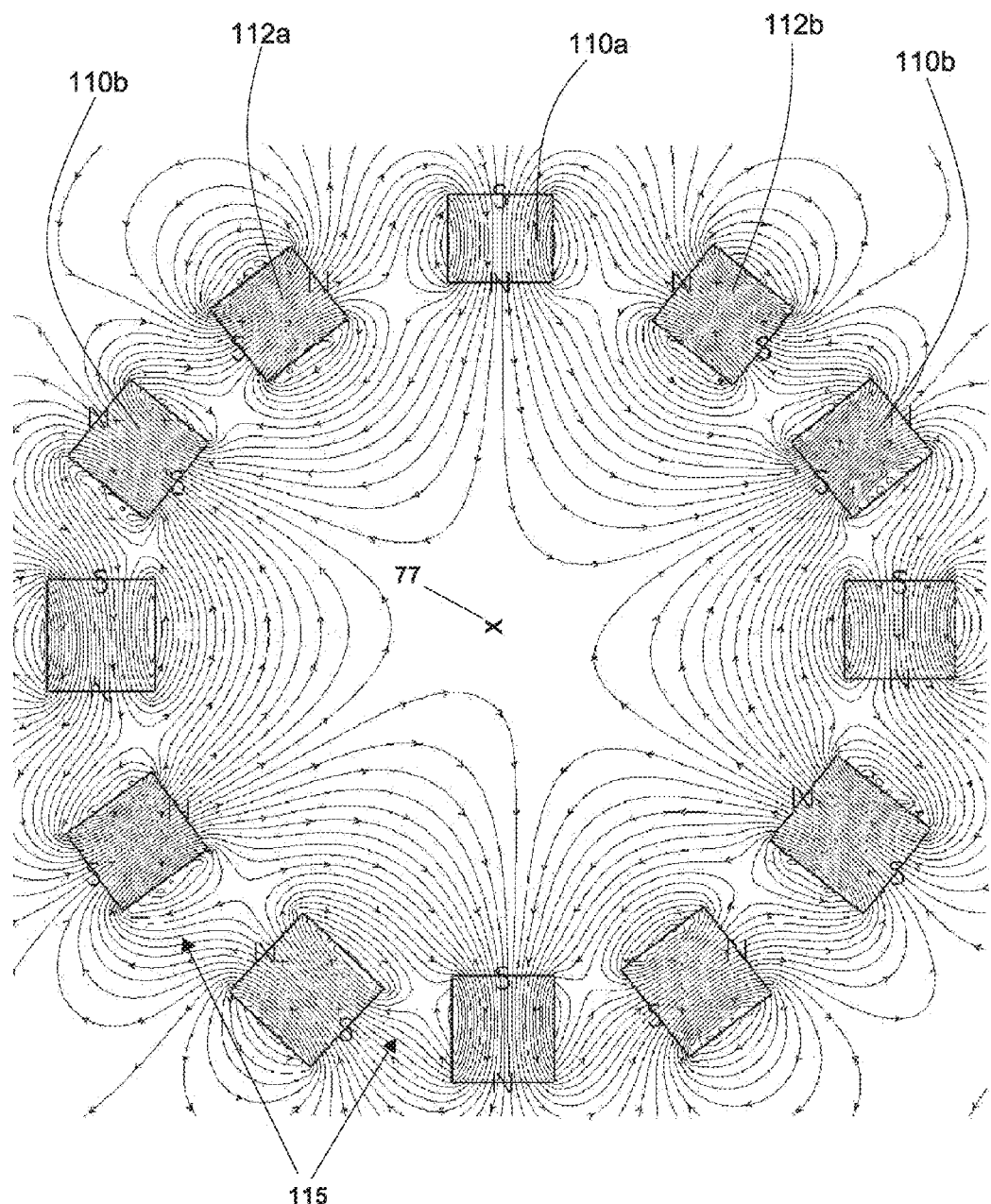
FIG. 12 is a high-level diagram showing the magnetic fields created by a Halbach array of magnets.

Referring to FIG. 12, as previously mentioned the magnets 78a, 78b of the rotor 74 may be provided in the form of a Halbach array. A Halbach array may be used to augment the magnetic field 115 radially towards the axis 77 while greatly reducing the magnetic field radially away from the axis 77. This may be useful to direct the magnetic field inward toward the inductive laminates 80a, 80b.

As shown in this example, the north and south poles of every other magnet 110a, 110b in the Halbach array are directed radially toward and away from the axis 76. The magnetic orientations of these magnets 110a, 110b are alternated. That is, the north poles of magnets 110a are oriented toward the axis 76 while the north poles of magnets 110b are oriented away from the axis 76. The intervening magnets 112a, 112b, on the other hand, are magnetically oriented along the cylinder in alternating orientation. For example, the north pole of a first magnet 112a is oriented circumferentially in a first direction whole the north pole of a second magnet 112b is oriented in the opposite direction. This pattern is repeated around the cylinder to provide the illustrated magnetic fields.

Figure 13:
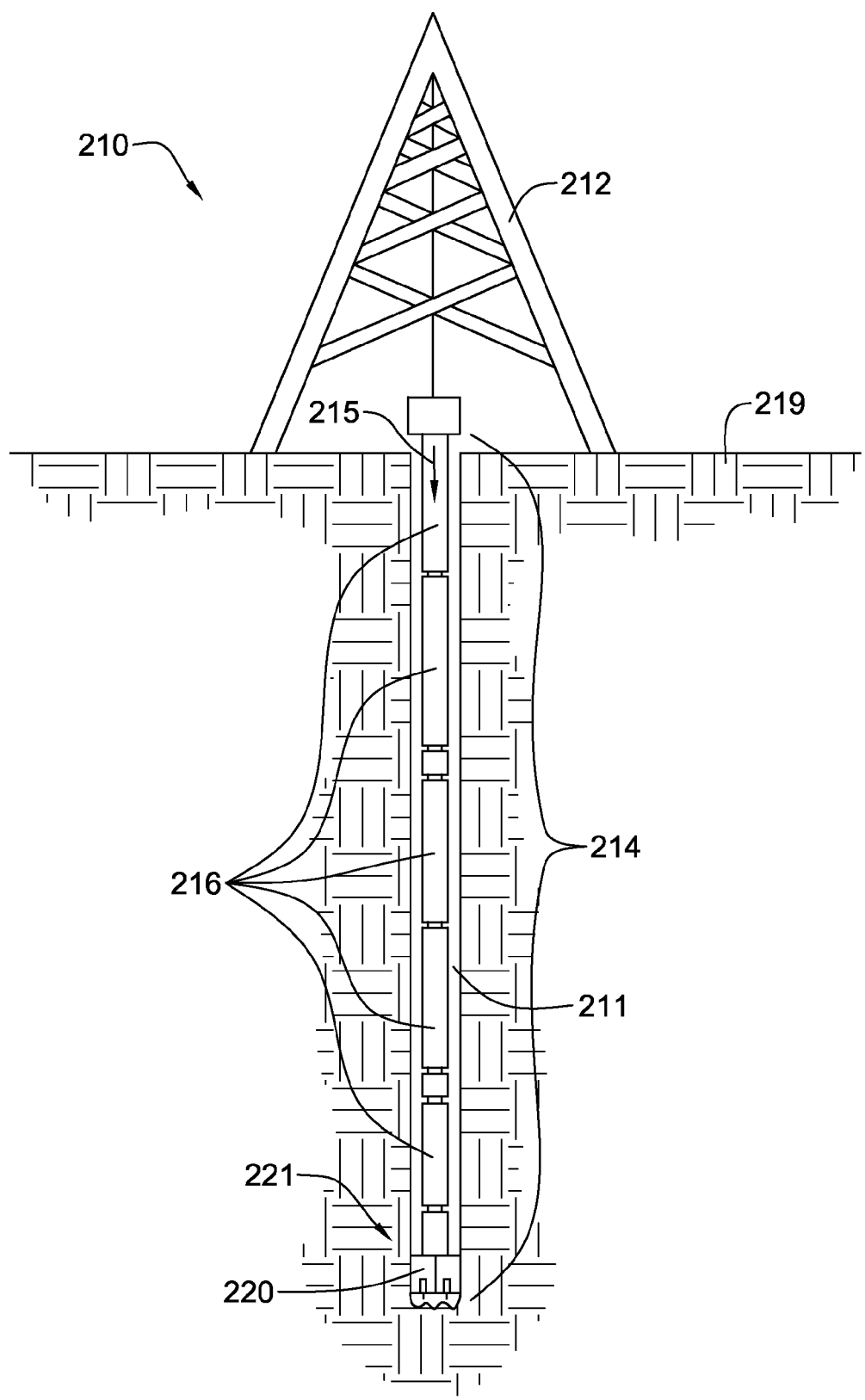
FIG. 13 is a profile view of one embodiment of a drill rig and drill string in accordance with the present invention.

Referring to FIG. 13, a drill rig 210 may include a derrick 212 and a drill string 214 comprised of multiple sections of drill pipe 216 and other downhole tools.

The drill string 214 is typically rotated by the drill rig 210 to turn a drill bit 220 that is loaded against the earth 219 to form a borehole. Rotation of the drill bit 220 may alternately be provided by other downhole tools such as drill motors, or drill turbines (not shown) located adjacent to the drill bit 220.

A bottom hole assembly 221 may include a drill bit 220, sensors, and other downhole tools such as logging-while-drilling ("LWD") tools, measurement-while-drilling ("MWD") tools, diagnostic-while-drilling ("DWD") tools, or the like. Other downhole tools may include heavyweight drill pipe, drill collar, stabilizers, hole openers, sub-assemblies, under-reamers, rotary steerable systems, drilling jars, drilling shock absorbers, and the like, which are all well known in the drilling industry.

While drilling, a drilling fluid is typically supplied under pressure at the drill rig 210 through the drill string 214. The drilling fluid typically flows in a direction 215 downhole through the central bore of the drill string 214 and then returns in an opposite direction uphole to the drill rig 210 through the annulus 211. Pressurized drilling fluid is circulated around the drill bit 220 to provide a flushing action to carry cuttings to the surface.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

We claim:

1. A downhole generator comprising:
    a body having a wall with an outer surface and an inner surface, said inner surface defining a bore configured to pass a fluid through said body;
    a recess formed within said wall;
    a cover configured to removably mount about said outer surface and said cover sized to cover said recess to form an enclosure;
    an inlet channel configured to pass said fluid from said bore to said enclosure;
    an outlet channel configured to pass said fluid from said enclosure;
    a turbine disposed within said enclosure and positioned to receive said fluid from said inlet channel and to discharge said fluid into said outlet channel, said turbine being configured for rotation by said fluid received from said inlet channel, and said turbine having an output shaft to transmit rotational energy;
    a transmission coupled to said shaft to transmit rotational energy from said shaft, said transmission having a continuously variable gear ratio;
    a flywheel within said enclosure, said flywheel having a rotor coupled to said transmission and said flywheel configured to receive, store, and deliver said rotational energy; and,
    an electrical generator within said enclosure operably coupled to said flywheel and said electrical generator configured to convert said rotational energy to electrical energy.

2. The downhole generator of claim 1, further comprising magnetic bearings to support a load of said flywheel during rotation.

3. The downhole generator of claim 2, wherein said magnetic bearings comprise a Halbach array of magnets.

4. The downhole generator of claim 2, wherein said magnetic bearings comprise laminates that apply a force in at least one of a substantially perpendicular direction and a substantially parallel direction to an axis of a rotor of said generator.

5. The downhole generator of claim 2, wherein a rotor may be formed with a radius cut at or near at least one corner of at least one magnet.

6. The generator of claim 5, wherein said cuts are near where spokes interface said rotor.

7. The downhole generator of claim 1, further comprising a valve to regulate a flow of said portion of downhole fluid through said inlet channel.

8. The downhole generator of claim 1, wherein said coupling between said transmission and said turbine is a magnetic coupling.

9. The downhole generator of claim 1, further comprising a vacuum chamber enclosing at least one of said flywheel and said generator.

10. The downhole generator of claim 1, wherein an outlet channel vents said downhole fluid into an annulus between said downhole drill string component and a borehole wall.

11. A method for generating electricity in a downhole environment, the method comprising:
    providing a downhole drill string component having a body having a wall with an outer surface and an inner surface, said inner surface defining a bore configured to pass a fluid through said body, a recess formed within said wall, an inlet channel connecting said bore and said enclosure, an outlet channel connecting said enclosure and said bore, and said enclosure having a turbine, a transmission, a flywheel and an electrical generator disposed therein;
    providing a stream of fluid at said bore, said stream of fluid having kinetic energy, conveying a portion of said stream of fluid to said enclosure, conveying said portion of said stream of fluid through said turbine to convert said kinetic energy into rotational energy, and conveying said portion of said stream of fluid through said outlet channel out of said enclosure
    transferring said rotational energy from said turbine to said transmission through a magnetic coupling;
    transferring said rotational energy from said transmission to said flywheel, thereby causing said flywheel to store said rotational energy; and,
    converting said rotational energy to electrical energy with said electrical generator.

12. The method of claim 11, further comprising magnetically levitating said flywheel.

13. The method of claim 12, wherein magnetically levitating comprises levitating said flywheel using a Halbach array of magnets.

14. A drill string component for generating electricity, said drill string component comprising:
    a tubular body, said tubular body having a wall with an outer surface and an inner surface, said inner surface defining a bore for conveying a fluid;
    a recess formed within said wall;

a cover configured to removably mount about said outer surface and said cover sized to cover said enclosure;

an inlet channel within said wall, said inlet channel configured to convey said fluid from said bore to said enclosure;

an outlet channel configured to vent said fluid from said enclosure;

a turbine disposed within said enclosure, said turbine configured to convert a kinetic energy of said fluid flowing from said inlet channel to said outlet channel into rotational energy;

a transmission having a magnetic coupling configured to couple said transmission and said turbine;

a flywheel coupled to said transmission, said flywheel configured to store said rotational energy imparted by said turbine through said transmission; and, an electrical generator operably coupled to said flywheel to convert said rotational energy into electrical energy.

15. The method of claim 14, wherein said method further comprises a step of regulating a flow of said moving downhole fluid.

16. The downhole generator of claim 14, further comprising:

a vacuum chamber disposed within said enclosure; and, wherein at least one of said flywheel and said electrical generator is disposed within said vacuum chamber.

* * * * *